Feb. 9, 1932.  A. W. PRIEBE  1,844,263
ARC WELDING CHILL
Filed Nov. 16, 1929
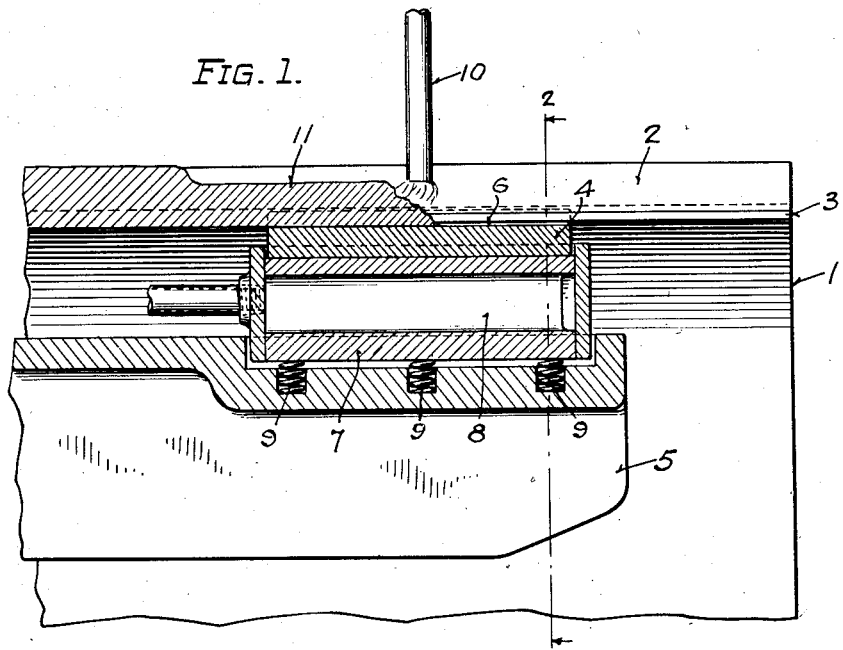
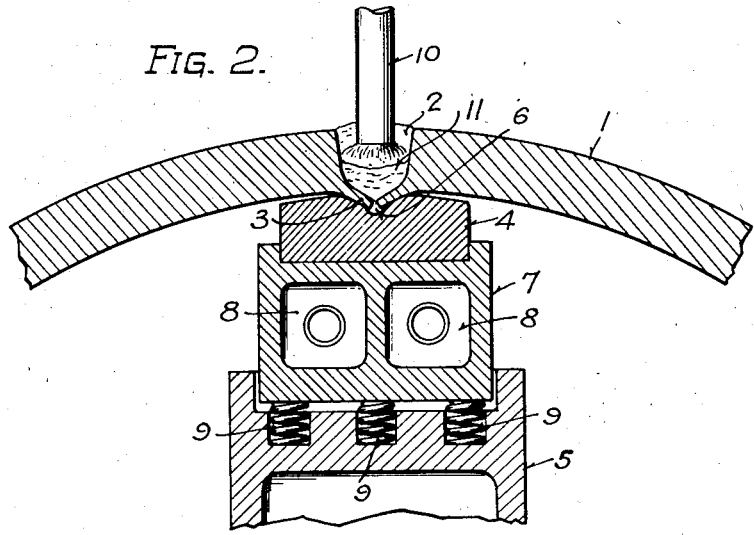
INVENTOR.
Arthur W. Priebe
BY
ATTORNEY.

Patented Feb. 9, 1932

1,844,263

UNITED STATES PATENT OFFICE

ARTHUR W. PRIEBE, OF MILWAUKEE, WISCONSIN, ASSIGNOR TO A. O. SMITH CORPORATION, OF MILWAUKEE, WISCONSIN, A CORPORATION OF NEW YORK

ARC WELDING CHILL

Application filed November 16, 1929. Serial No. 407,687.

This invention relates to electric arc welding chills and more particularly to chills for the electric arc welding of longitudinal seams in pipe wherein the chill is moved along beneath the seam simultaneously with the welding arc which traverses the seam above.

The object of the invention is to provide a chill which, in cooperation with special shaped edges to be welded, is self-guided along the seam and which maintains a predetermined contact with the metal being welded to thereby increase the efficiency of the chill and the consequent uniformity of product.

In carrying out the invention the edges to be welded, or the meeting portion thereof, are bent downwardly and engage with a groove arranged in the upper surface of the chill block. The dimensions of the projecting edge portions and of the groove are preferably so proportioned as to maintain a predetermined contact therebetween and to provide a maximum uniform penetration of the weld to the lowest part of the meeting edges. The nesting of the edge projections in the groove provides a guide for the movement of the chill block along the seam and allows a compensation for possible irregularities in the metal being welded without endangering disalignment of the chill and seam.

The preferred embodiment of the invention is illustrated in the accompanying drawings in which the views are as follows:

Figure 1 is a longitudinal vertical section through the center of the chill and work showing the welding operation.

Fig. 2 is a section on line 2—2 of Figure 1.

The pipe blank 1 has its longitudinal meeting edges chamfered to form a welding groove 2 with the portion of the edges meeting at the bottom of the groove forming a guiding projection or rib 3.

The chill block 4 is movably supported by an arm 5 extending into the blank, and is pressed against the metal of the seam to be welded. The chill block 4 has a longitudinal groove 6 cut in its upper surface for receiving the projection 3.

The groove 6 is preferably V-shaped to provide a space at its apex beneath the line of meeting of the edges so as to allow a maximum penetration of the weld at such meeting line and thereby insure an efficient welding of the meeting portions of the edges together.

The groove 6 is preferably of minimum depth less than the projection of the rib 3 so as to prevent the chill block 4 from contacting at its upper surface with the lower surface of the metal of blank 1 on either side of the seam. By this construction, the chill block 4 contacts only with the tapered sides of the rib 3 and is guided along the seam thereby and at the same time the chill block is allowed to move in a manner to compensate for possible and sometimes frequent irregularities in the rib 3 or the metal of the blank 1.

The chill block 4 is preferably mounted on a cooling member 7 which has passages 8 for the circulation of a cooling fluid such as water. The cooling member 7 is preferably resiliently mounted on the arm 5 by means of the springs 9 which allow rocking of the chill block to compensate for irregularities in the rib 3.

In the welding of the blank 1 a metallic weldrod 10 is made to pass along the welding groove 2 in arcing relation to the metal of the edges, and to deposit welding metal 11 in the groove and thereby fuse the edges into an integral structure. The chill block 4 is placed directly beneath the arc and is moved simultaneously with the weldrod 10 along the edges so that the chill prevents burning of the metal at the bottom of the welding groove and constantly supports the same against the heat of the arc.

The invention above set forth may be modified in various ways within the scope of the accompanying claims.

I claim:

1. An arc welding chill comprising a chill block having a groove in its upper surface, the side walls of said groove contacting with the metal to be welded and thereby providing a guide for said chill block.

2. An arc welding chill comprising a chill block having a groove in its upper surface, the side walls of said groove contacting with the metal to be welded to provide a guide for said chill block, and the upper surface of said chill block being spaced from the metal to be welded to allow said chill block to be maintained in predetermined relation with regard to the seam irrespective of irregularities in the metal to be welded.

3. An arc welding chill comprising a chill block having a groove in its upper surface, said groove having its side walls in contact with guiding means whereby said chill block is maintained in alignment with the seam to be welded, and means for moving said chill block along the seam to be welded.

4. An arc welding chill comprising a chill block having a V-shaped groove in its upper surface, said groove being in contact with preformed portions of the metal to be welded and the apex of the groove providing a space directly beneath the meeting edges to be welded to allow maximum penetration of the weld therethrough.

5. An arc welding chill comprising a chill block having a groove in its upper surface, and spring pressure means for resiliently supporting the same with the side walls of the groove in contact with the metal to be welded.

In testimony whereof I have signed my name at Milwaukee, Wisconsin, this 14th day of November, 1929.

ARTHUR W. PRIEBE.